(12) United States Patent
Endo et al.

(10) Patent No.: US 6,687,439 B1
(45) Date of Patent: Feb. 3, 2004

(54) LIGHT-AMPLIFYING OPTICAL FIBER AND METHOD OF MAKING THE SAME

(75) Inventors: Shinji Endo, Yokohama (JP); Shinji Ishikawa, Yokohama (JP); Motoki Kakui, Yokohama (JP); Toshimi Suzuki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/674,071

(22) PCT Filed: Feb. 25, 2000

(86) PCT No.: PCT/JP00/01105
§ 371 (c)(1),
(2), (4) Date: Oct. 26, 2000

(87) PCT Pub. No.: WO00/51213
PCT Pub. Date: Aug. 31, 2000

(30) Foreign Application Priority Data

Feb. 26, 1999 (JP) ............................................ 11/051104

(51) Int. Cl.[7] ................................................ G02B 6/02
(52) U.S. Cl. ........................................................ 385/123
(58) Field of Search ................................. 385/123, 124, 385/126, 121, 5; 428/379, 365, 32.4; 372/6; 501/37, 42, 43, 9; 65/32.4

(56) References Cited

U.S. PATENT DOCUMENTS

| 4,959,837 | A |   | 9/1990 | Fevrier et al. ................. 372/6 |
| 5,047,076 | A |   | 9/1991 | Cognolato et al. ............ 65/3.12 |
| 5,668,659 | A | * | 9/1997 | Sakamoto et al. ......... 359/341.5 |
| 5,696,782 | A | * | 12/1997 | Harter et al. ................ 372/102 |
| 5,712,941 | A | * | 1/1998 | Imoto et al. ................. 385/123 |
| 5,778,129 | A | * | 7/1998 | Shukunami et al. ......... 359/343 |

FOREIGN PATENT DOCUMENTS

| EP | 0243010 A1 | 10/1987 | |
| EP | 0313209 A1 | 4/1989 | |
| EP | 313209 | 4/1989 | ............. H01S/3/06 |
| EP | 0896404 A1 | 2/1999 | |
| EP | 896404 | 2/1999 | ............. H01S/3/06 |
| JP | 03127032 A | 5/1991 | |
| JP | 3-127032 | 5/1991 | ............. G02F/1/35 |
| JP | 03228849 A | 10/1991 | |
| JP | 3-228849 | 10/1991 | ............ G03C/13/04 |
| JP | 5-29697 | 2/1993 | ............. H01S/3/17 |
| JP | 05-029697 | 2/1993 | |
| JP | 7-211980 | 8/1995 | ............ C03C/13/04 |
| JP | 07-211980 | * 8/1995 | ............. H01S/3/17 |

OTHER PUBLICATIONS

International Search Report dated Jun. 6, 2000.
"Al Concentration dependence of amplification characteristics of EDP", T. Kashiwada et al., Sumitomo Electric Industries, Ltd., p. 273 (with English translation).

* cited by examiner

Primary Examiner—Frank G. Font
Assistant Examiner—Kevin C Kianni
(74) Attorney, Agent, or Firm—McDermott, Will & Emery

(57) ABSTRACT

The present invention relates to a light-amplifying optical fiber comprising a structure for realizing a flat gain characteristic or oscillation characteristic in a wider wavelength band, and a method of making the same.

The light-amplifying optical fiber according to the present invention comprises a second doped area containing a first doped area including an optical axis center and having a larger outer diameter than the first doped area. The second doped area is doped with at least one of $Al_2O_3$, $P_2O_5$, $Y_2O_3$, and $B_2O_3$ as an oxide of an element having a valence different from that of a cation constituting a main material of the light-amplifying optical fiber; whereas the first doped area is doped with at least one of Er, Nd, Tm, Yb, and Pr as a rare-earth element together with the oxide.

8 Claims, 9 Drawing Sheets

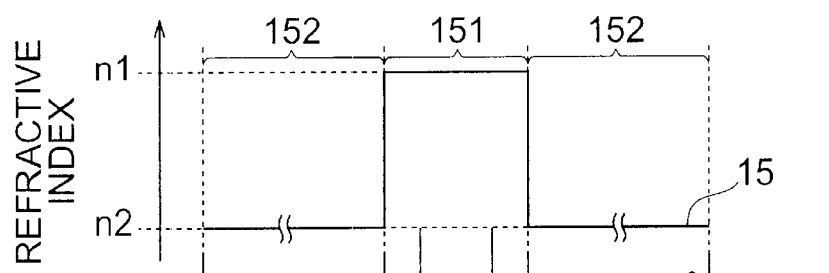
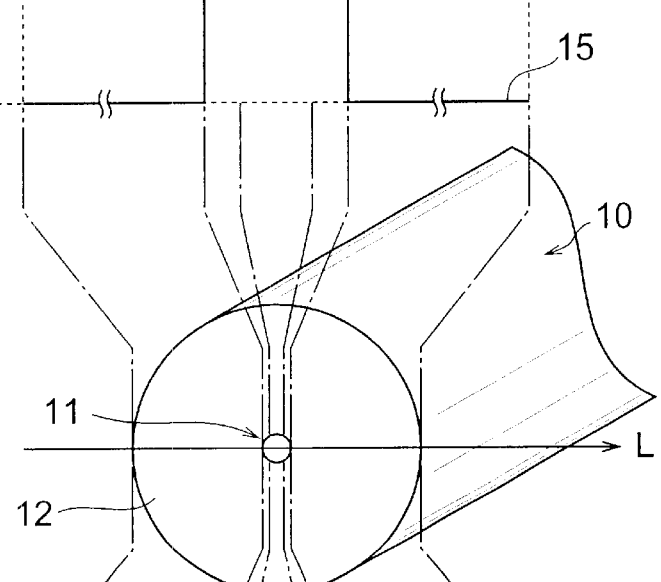
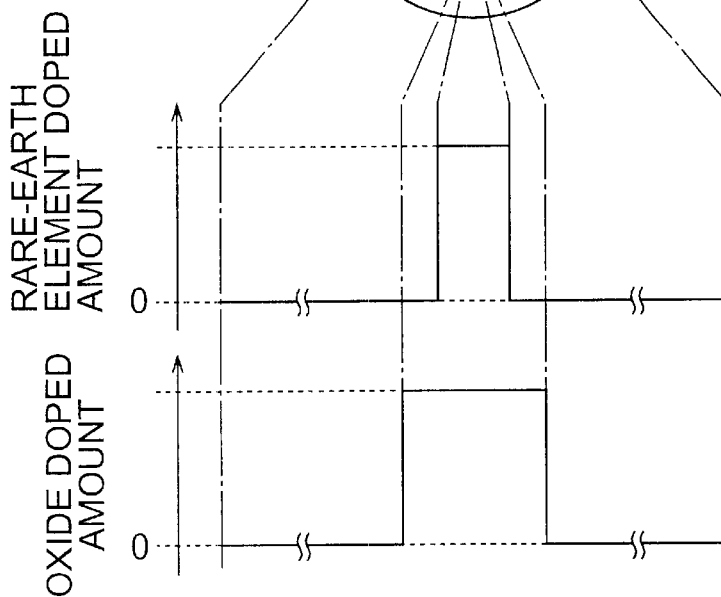
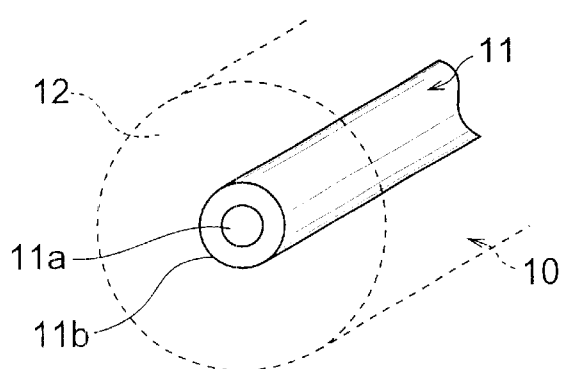
Fig.1A
Fig.1B
Fig.1C
Fig.1D
Fig.1E Fig.2A
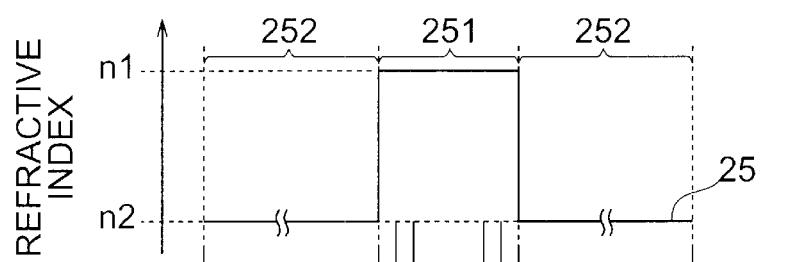
Fig.2B
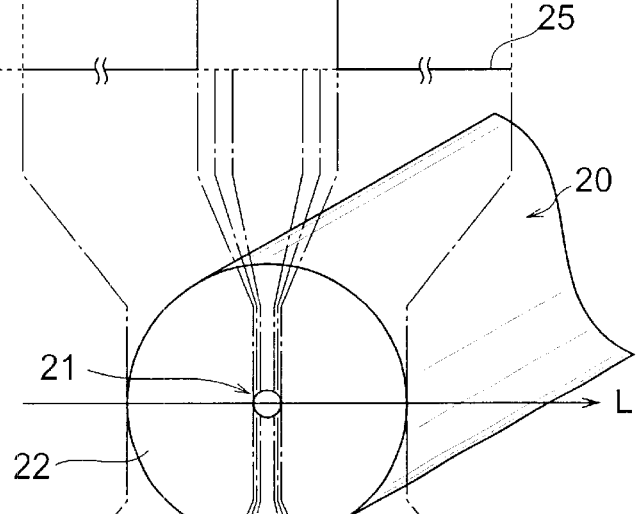
Fig.2C
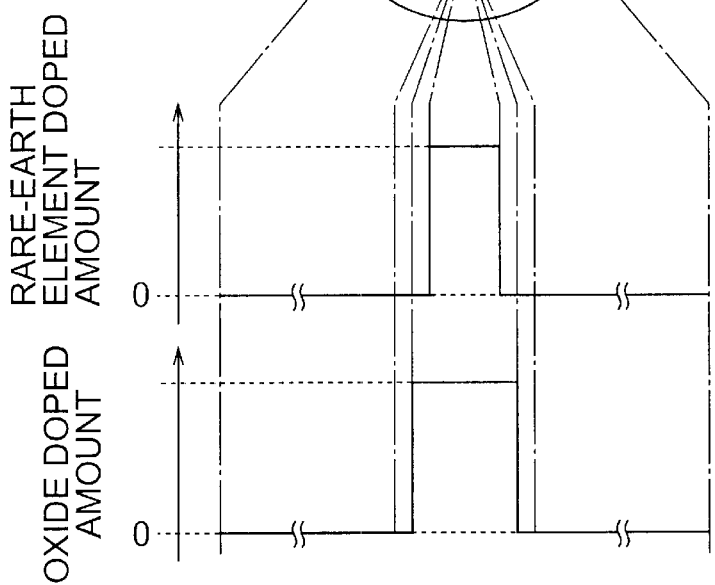
Fig.2D
Fig.2E
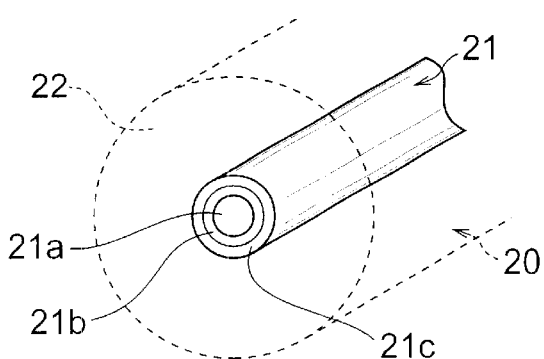

Fig.4A
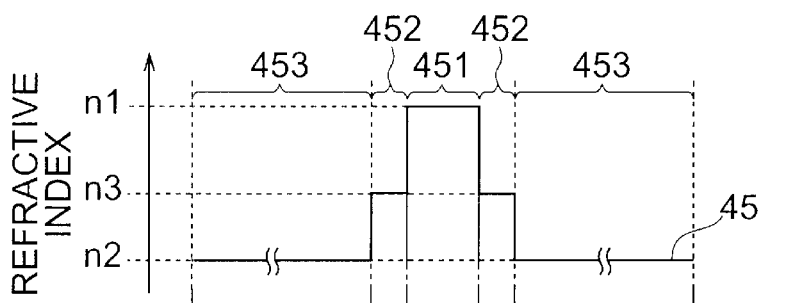
Fig.4B
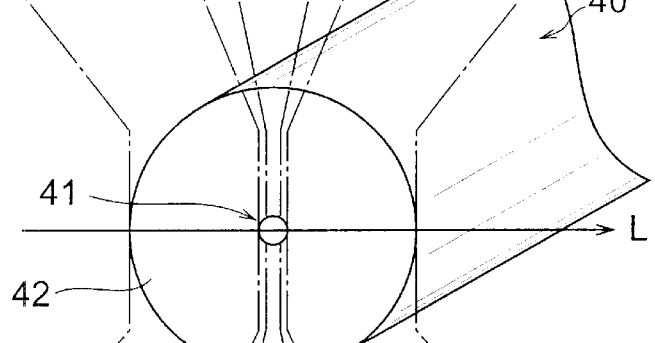
Fig.4C
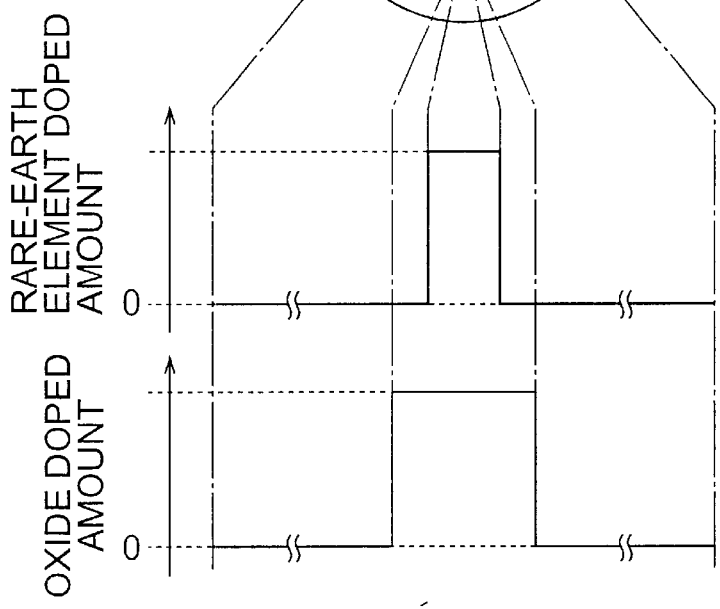
Fig.4D
Fig.4E
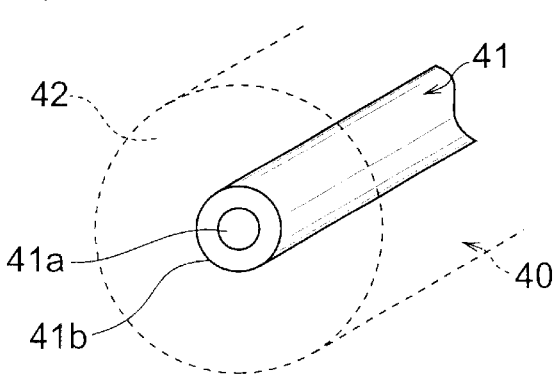

LIGHT-AMPLIFYING OPTICAL FIBER AND METHOD OF MAKING THE SAME

TECHNICAL FIELD

The present invention relates to a light-amplifying optical fiber applicable to optical fiber amplifiers, optical fiber laser oscillators, and the like; and a method of making the same.

BACKGROUND ART

A light-amplifying optical fiber is an optical waveguide in which a rare-earth element such as Er is added into a core region. It has been known that, when an optical fiber doped with a rare-earth element is supplied with light having a wavelength capable, of exiting the rare-earth element, then a population inversion is formed therein, whereby a stimulated emission at a wavelength corresponding to the wavelength of excitation light occurs. Therefore, light-amplifying optical fibers are widely utilized in optical fiber amplifiers for amplifying signal light having a wavelength coinciding with the wavelength of the stimulated emission light and in optical fiber laser oscillators for outputting laser oscillation light having a wavelength coinciding with the wavelength of the stimulated emission light. Optical fiber amplifiers and optical fiber laser oscillators are desired to have a high and flat gain characteristic or oscillation characteristic in a wider wavelength band. Consequently, the light-amplifying optical fibers employed in the optical fiber amplifiers, optical fiber laser oscillators, and the like have been under study and development from such a viewpoint.

For example, Japanese Patent Application Laid-Open No. HEI 1-145881 discloses a light-amplifying optical fiber in which a part of a core region including its optical axis center is doped with Er element. The light-amplifying optical fiber according to this first conventional example attains a higher gain by approximating the intensity distribution of signal light or laser oscillation light and the distribution of Er element to each other. On the other hand, Japanese Patent Application Laid-Open No. HEI 5-283789 discloses a light-amplifying optical fiber in which Er element is added to the whole core region, whereas $Al_2O_3$ is added into the core region. Due to such a structure in which Er element and $Al_2O_3$ are added into the same region, the light-amplifying optical fiber according to this second conventional example attains a wider and flatter amplification wavelength band.

Disclosure of the Invention

Having studied conventional techniques such as those mentioned above, the inventors have found problems as follows. When an optical fiber in which at least a part of a core region including its optical axis center is doped with both of Er element and $Al_2O_3$ is employed, a higher gain in optical fiber amplifiers and the like, and a wider amplification wavelength band and flatter, gain in their amplification wavelength band can be expected. However, since Er element and $Al_2O_3$ diffuse due to the heating and softening of the optical fiber preform in the process of making the optical fiber employed in optical fiber amplifiers and the like, it is difficult for the added Er element and $Al_2O_3$ to be confined only in a part of the core region of the optical fiber in practice. If Er element also exists in an area with a low $Al_2O_3$ content due to the diffusion mentioned above, the amount of Er element binding to the main ingredient, $SiO_2$, without binding to $Al_2O_3$ will increase. As a result, optical fiber amplifiers and the like employing conventional light-amplifying optical fibers such as those mentioned above may not fully achieve a wider band and flatter gain in their amplification wavelength bands.

If the doped amount of $Al_2O_3$ is enhanced in order to overcome a problem caused by the diffusion of Er element as mentioned above, on the other hand, then crystals of $Al_2O_3$ are more likely to be formed. Therefore, there is a limit to the doped amount of $Al_2O_3$, which inevitably restricts the widening of band and flattening of gain in amplification wavelength bands in optical fiber amplifiers and the like.

While in the case of a light-amplifying optical fiber whose core region is wholly doped with Er element and $Al_2O_3$ it is comparatively unnecessary to take account of the diffusion of Er element and the like upon the heating and softening of the optical fiber preform during the manufacturing process. In the case of such a light-amplifying optical fiber, in which the doped amount of $Al_2O_3$ in the core region can be easily increase, it appears to be more likely to achieve a wider band and flatter gain in amplification wavelength bands in optical fiber amplifiers and the like as compared with the above-mentioned light-amplifying optical fiber in which only a part of its core region is doped with Er element or the like. Even in this case, however, Er element and the like cannot be kept from diffusing upon the heating and softening of the optical fiber preform in its making process, whereby the possibility of increasing Er element binding to the main material, $SiO_2$, without binding to $Al_2O_3$ cannot be denied. Hence, there is still a limit to the widening of band and flattening of gain in amplification wavelength bands in optical fiber amplifiers and the like employing an optical fiber whose whole core region is doped with both of Er element and $Al_2O_3$.

In order to overcome the above-mentioned problems, it is an object of the present invention to provide a light-amplifying optical fiber comprising a structure capable of achieving a higher and flatter gain characteristic or oscillation characteristic in a wider wavelength band; and a method of making the same.

The light-amplifying optical fiber according to the present invention is an optical component applicable to optical fiber amplifiers, optical fiber laser oscillators, and the like; and comprises a core region extending along a predetermined axis, and a cladding region, provided on the outer periphery of the core region, having a refractive index lower than that of the core region.

In particular, the light-amplifying optical fiber according to the present invention comprises a first doped area, with an outer diameter a, extending along the predetermined axis; and a second doped area, with an outer diameter b (>a), containing the first doped area. The first doped area is a glass region doped with at least a rare-earth element, for example, such as one of Er, Nd, Tm, Yb, and Pr, within the light-amplifying optical fiber. The second doped area is a glass region doped with at least an oxide of an element having a valence different from that of a cation constituting a main material, $SiO_2$, of the light-amplifying optical fiber, for example, such as one of $Al_2O_3$, $P_2O_5$, $Y_2O_3$, and $B_2O_3$, containing the first doped area.

In this case, even if the rare-earth element and the oxide such as $Al_2O_3$ diffuse upon the heating and softening of the optical fiber preform in the process of making the light-amplifying optical fiber, the rare-earth element diffused from the first doped area will substantially reside within the second doped area and thus will be more likely to bind to the oxide than to the main material of the light-amplifying optical fiber. Hence, by providing a structure in which the diffusing rare-earth element and the oxide such as $Al_2O_3$ are likely to bind together, the light-amplifying optical fiber according to the present invention attains a higher and flatter gain characteristic or oscillation characteristic in a wider wavelength band.

Preferably, the doped amount of the oxide such as $Al_2O_3$ added to the second doped area is substantially uniform in a diametric direction of the light-amplifying optical fiber orthogonal to an optical axis thereof.

In the light-amplifying optical fiber according to the present invention, while the second doped area contains the first doped area, the first and second doped areas and the core region have various modes of relationships therebetween.

For example, they may be configured such that the first doped area is formed as a part of the core region, whereas the second doped area containing the first doped area coincides with the core region (first embodiment). In this first embodiment, while the outer diameter of the first doped area is smaller than that of the core region, the outer diameter of the second doped area coincides with that of the core region. Also, each of the first and second doped areas may constitute a part of the chore region (second embodiment). In this second embodiment, the outer diameter of each of the first and second doped areas is smaller than that of the core region. In a third embodiment, the first doped area constitutes the core region, whereas the second doped area constitutes a part or the whole of the cladding region. In the third embodiment, the outer diameter of the first doped area coincides with that of the core region. While the structural relationship between the first and second doped areas in a fourth embodiment is similar to that in the first embodiment, the structure of the core region itself in the light-amplifying optical fiber differs from that in the first embodiment. Namely, it is not always necessary for the respective parts of the core region constituting the first and second doped areas to have refractive indices identical to each other.

Further, the core region in the light-amplifying optical fiber according to the invention is doped with at least, one of $GeO_2$ and a halogen element. When doped with $GeO_2$ or Cl element, which is a halogen element, the core region can raise its refractive index on the other hand, F element, which is a halogen element, can be utilized as a refractive index lowering agent in the cladding region. When a halogen element is added together with $GeO_2$, the degree of freedom in designing the refractive index profile enhances. Also, even in the case where the same form of refractive index profile is to be obtained, the doped amount of $GeO_2$ can be made relatively smaller, whereby it is preferable for lowering transmission loss.

In the light-amplifying optical fiber according to the present invention, the ratio (a/b) of the outer diameter a of the first doped area to the outer diameter b of the second doped area is preferably 0.1 or more but 0.9 or less. When the outer diameter of lathe second doped area is thus set greater than that of the first doped area, the binding between the rare-earth element and the main material of the light-amplifying optical fiber, $SiO_2$, is suppressed, whereby a sufficient gain is obtained.

In the method of making a light-amplifying optical fiber according to the present invention, a first area (corresponding to an outer part of the second doped area) containing an oxide of an element having a valence different from that of a cation constituting a main material of a glass pipe is initially formed one an inner wall of the glass pipe (first step). Subsequently, on an inner wall of the first area formed by the first step, a second area (corresponding to the first doped area and an inner part of the second doped area) doped with a rare-earth element and the oxide is formed (second step). The glass pipe thus formed is solidified (third step), whereby an optical fiber preform is obtained. This optical fiber preform is drawn (fourth step), so as to yield the light-amplifying optical fiber configured such that the first doped area doped with at least a rare-earth element is contained in the second doped area doped with an oxide such as $Al_2O_3$. Here, each of the first and second areas respectively formed in the first and second steps constitutes a glass region to become the core region of the light-amplifying optical fiber.

BRIEF DESCRIPTION OF THE DRAWINGS

FIGS. 1A to 1E are views showing structures of the first embodiment in the light-amplifying optical fiber according to the present invention, in which FIG. 1A is a refractive index profile of the light-amplifying optical fiber according to the first embodiment, FIG. 1B is a view showing a cross-sectional structure of the light-amplifying optical fiber according to the first embodiment, FIG. 1C is a chart showing the doped amount of rare-earth element in the first doped area in the first embodiment, FIG. 1D is a chart showing the doped amount of oxide in the second doped area in the first embodiment, and FIG. 1E is a view showing a detailed cross-sectional structure of the core region in the light-amplifying optical fiber according to the first embodiment;

FIGS. 2A to 2E are views showing structures of the second embodiment in the light-amplifying optical fiber according to the present invention, in which FIG. 2A is a refractive index profile of the light-amplifying optical fiber according to the second embodiment, FIG. 2B is a view showing a cross-sectional structure of the light-amplifying optical fiber according to the second embodiment, FIG. 2C is a chart showing the doped amount of rare-earth element in the first doped area in the second embodiment, FIG. 2D is a chart showing the doped amount of oxide in the second doped area in the second embodiment, and FIG. 2E is a view showing a detailed cross-sectional structure of the core region in the light-amplifying optical fiber according to the second embodiment;

FIGS. 3A to 3E are views showing structures of the third embodiment in the light-amplifying optical fiber according to the present invention, in which FIG. 3A is a refractive index profile of the light-amplifying optical fiber according to the third embodiment, FIG. 3B is a view showing a cross-sectional structure of the light-amplifying optical fiber according to the third embodiment, FIG. 3C is a chart showing the doped amount of rare-earth element in the first doped area in the third embodiment, FIG. 3D is a chart showing the doped amount of oxide in the second doped area in the third embodiment, and FIG. 3E is a view showing a detailed cross-sectional structure of the core region in the light-amplifying optical fiber according to the third embodiment;

FIGS. 4A to 4E are views showing structures of the fourth embodiment in the light-amplifying optical fiber according to the present invention, in which FIG. 4A is a refractive index profile of the light-amplifying optical fiber according to the fourth embodiment, FIG. 4B is a view showing a cross-sectional structure of the light-amplifying optical fiber according to the fourth embodiment, FIG. 4C is a chart showing the doped amount of rare-earth element in the first doped area in the fourth embodiment, FIG. 4D is a chart showing the doped amount of oxide in the second doped area in the fourth embodiment, and FIG. 4E is a view showing a detailed cross-sectional structure of the core region in the light-amplifying optical fiber according to the fourth embodiment;

BEST MODE FOR CARRYING OUT THE INVENTION

Figure 3A:
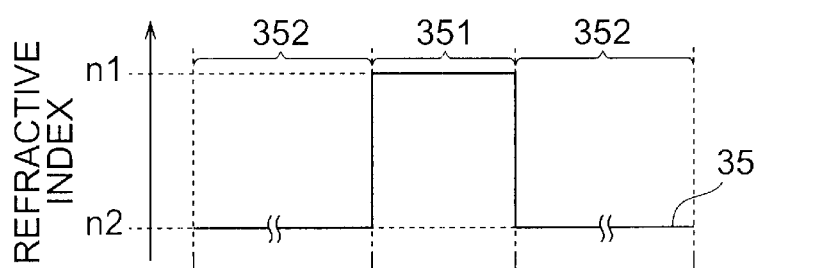

In the following, embodiments of the light-amplifying optical fiber according to the present invention will be explained with reference to FIGS. 1A to 5E and 6 to 9. In the explanation of the drawings, constituents identical to each other will be referred to with numerals or letters identical to each other, without repeating their overlapping descriptions.

First Embodiment

FIGS. 1A to 1E are views showing structures of the first embodiment in the light-amplifying optical fiber according to the present invention. In particular, FIG. 1A is a refractive index profile of the light-amplifying optical fiber according to the first embodiment, FIG. 1B is a view showing a cross-sectional structure of the light-amplifying optical fiber according to the first embodiment, FIG. 1C is a chart showing the doped amount of rare-earth element in the first doped area in the first embodiment, FIG. 1D is a chart showing the doped amount of oxide in the second doped area in the first embodiment, and FIG. 1E is a view showing a detailed cross-sectional structure of the core region in the light-amplifying optical fiber according to the first embodiment.

The light-amplifying optical fiber 10 according to the first embodiment is mainly made of $SiO_2$; and comprises, as shown in FIG. 1B, a core region 11, with a refractive index n1, extending along a predetermined axis, and a cladding region 12, with a refractive index n2 lower than that of the core region 11, provided on the outer periphery of the core region 11. The core region 11 comprises, as shown in FIG. 1E, an inner core 11a constituting a first doped area doped with at least a rare-earth element and an oxide (sub-host) such as $Al_2O_3$; and an outer core 11b, provided on the outer periphery of the inner core 11a, constituting, together with the inner core 11a, a second doped area doped with the sub-host. Such ash core configuration yields a structure in which the rare-earth element is intensively added to a part of the core region 11 as shown in FIG. 1C, whereas the sub-host is added to the whole core region 11 as shown in FIG. 1D.

As shown in FIG. 1A, the light-amplifying optical fiber 10 according to the first embodiment has a matched type refractive index profile 15. The inner core 11a and outer core 11b constituting the core region 11 are set to have the same refractive index. The core region 11 is doped with a refractive index enhancing agent such as $GeO_2$ or Cl. Here, the cladding region 12 may be doped with F element, which is a refractive index lowering agent. Doping the cladding region 12 with F element is preferable from the viewpoint of lowering transmission loss since the doped amount of $GeO_2$ and the like can be reduced, without modifying the shape of the refractive index profile 15.

The refractive index profile 15 of FIG. 1A indicates the refractive index in each part on the line L in FIG. 1B, in which areas 151 and 152 show the refractive indices of individual parts in the core region 11 (including the inner core 11a and outer core 11b) and the cladding region 12, respectively.

The inner core 11a, which is a part of the core region 11, is doped, as the first, doped area, with a rare-earth element (see FIG. 1C). The doping rare-earth element is one of Er, Nd, Tm, Yb, and Pr, and generates a fluorescence having a wavelength in the infrared region when irradiated with a predetermined wavelength of excitation light. In particular, doping with Er element as the rare-earth element is preferable since it yields a fluorescence in the 1.55-μm wavelength band, which is a wavelength band yielding the lowest transmission loss in optical fibers in general.

Also, both of the inner core 11a and outer core 11b each constituting a part of the core region 11 are doped, as the second doped area, with a sub-host. The doping sub-host is an oxide of an element having a valence different from the valence, 4, of the cation constituting the main material, $SiO_2$, of the light-amplifying optical fiber 10; and is any of $Al_2O_3$, $P_2O_5$, $Y_2O_3$, and $B_2O_3$, for example. Preferably, the doped amount of sub-host is substantially uniform in a diametric direction of the light-amplifying optical fiber 10 orthogonal to the optical axis thereof as shown in FIG. 1D.

In the light-amplifying optical fiber 10 according to the first embodiment, as explained in the foregoing, the first doped area (corresponding to the inner core 11a) including the optical axis center is doped with a rare-earth element, whereas the second doped area (corresponding to the glass region defined by the inner core 11a and outer core 11b) containing the first doped area and having an outer diameter greater than that of the first doped area is doped with a sub-host. Therefore, even if the rare-earth element or sub-host diffuses upon the heating and softening of the optical fiber preform in the process of making the light-amplifying optical fiber 10, the rare-earth element will reside within the second doped area where the sub-host exists, thereby greatly improving the probability of the rare-earth element binding to the sub-host. As a result, the light-amplifying optical fiber 10 according to the first embodiment yields a higher and flatter gain characteristic or oscillation characteristic in a wider wavelength band.

For fully attaining effects such as those mentioned above, it is preferred that the first and second doped areas have a relation of $0.1 \leq a/b \leq 0.9$, where a is the outer diameter of the first doped area, and b is the outer diameter of the second doped area. That is, the relation of $0.1 \leq a/b$ is necessary for attaining a sufficient gain, whereas the relation of $a/b \leq 0.9$ is necessary for preventing the rare-earth element and the main material, $SiO_2$, from binding together.

Second Embodiment

FIGS. 2A to 2E are views showing structures of the second embodiment in the light-amplifying optical fiber according to the present invention. In particular, FIG. 2A is a refractive index profile of the light-amplifying optical fiber according to the second embodiment, FIG. 2B is a view showing a cross-sectional structure of the light-amplifying optical fiber according to the second embodiment, FIG. 2C is a chart showing the doped amount of rare-earth element in the first doped area in the second embodiment, FIG. 2D is a chart showing the doped amount of oxide in the second doped area in the second embodiment, and FIG. 2E is a view showing a detailed cross-sectional structure of the core region in the light-amplifying optical fiber according to the second embodiment.

The light-amplifying optical fiber 20 according to the second embodiment is mainly made of $SiO_2$; and comprises, as shown in FIG. 2B, a core region 21, with a refractive index n1, extending along a predetermined axis, and a cladding region 22, with a refractive index n2 lower than that of the core region 21, provided on the outer periphery of the core region 21. The core region 21 comprises, as shown in FIG. 2E, an inner core 21a constituting a first doped area doped with at least a rare-earth element and an oxide (sub-host) such as $Al_2O_3$; an intermediate core 21b, provided on the outer periphery of the inner core 21a, constituting, together with the inner core 21a, a second doped area doped with the sub-host; and an outer core 21c, provided on the outer periphery of the intermediate core 21b, containing neither the rare-earth element nor the sub-host. Such a core configuration yields a structure, as a part of the core region 21, in which the rare-earth element is intensively added to a part of the core region 21 as shown in FIG. 2C, whereas the sub-host is also intensively added to a part of the core region 21 as shown in FIG. 2D.

As shown in FIG. 2A, the light-amplifying optical fiber 20 according to the second embodiment has a matched type refractive index profile 25. The inner core 21a, intermediate core 21b, and outer core 21c constituting the core region 21 are set to have the same refractive index. The core region 21 is doped with a refractive index enhancing agent such as $GeO_2$ or Cl. Here, the cladding region 22 may be doped with F element, which is a refractive index lowering agent. Doping the cladding region 22 with F element is preferable from the viewpoint of lowering transmission loss since the doped amount of $GeO_2$ and the like can be reduced without modifying the shape of the refractive index profile 25.

The refractive index profile 25 of FIG. 2A indicates the refractive index in each part on the line L in FIG. 2B, in which areas 251 and 252 show the refractive indices of individual parts in the core region 21 (including the inner core 21a, intermediate core 21b, and outer core 21c) and the cladding region 22, respectively.

The inner core 21a, which is a part of the core region 21, is doped, as the first doped area, with a rare-earth element (see FIG. 2C). The doping rare-earth element is one of Er, Nd, Tm, Yb, and Pr, and generates a fluorescence having a wavelength in the infrared region when irradiated with a predetermined wavelength of excitation light. In particular, doping with Er element as the rare-earth element is preferable since it yields a fluorescence in the 1.55-μm wavelength band, which is a wavelength band yielding the lowest transmission loss in optical fibers in general.

Also, both of the inner core 21a and intermediate core 21b each constituting a part of the core region 21 are doped, as the second doped area, with a sub-host. The doping sub-host is an oxide of an element having a valence different from the valence, 4, of the cation constituting the main material, $SiO_2$, of the light-amplifying optical fiber 20; and is any of $Al_2O_3$, $P_2O_5$, $Y_2O_3$, and $B_2O_3$, for example. Preferably, the doped amount of sub-host is substantially uniform in a diametric direction of the light-amplifying optical fiber 20 orthogonal to the optical axis thereof as shown in FIG. 2D.

In the light-amplifying optical fiber 20 according to the second embodiment, as explained in the foregoing, the first doped area (corresponding to the inner core 21a) including the optical axis center is doped with a rare-earth element, whereas the second doped area (corresponding to the glass region defined by the inner core 21a and intermediate core 21b) containing the first doped area and having an outer diameter greater than that of the first doped area is doped with a sub-host. Therefore, even if the rare-earth element or sub-host diffuses upon the heating and softening of the optical fiber preform in the process of making the light-amplifying optical fiber 20, the rare-earth element will reside within the second doped area where the sub-host exists, thereby greatly improving the probability of the rare-earth element binding to the sub-host. As a result, the light-amplifying optical fiber 20 according to the second embodiment yields a higher and flatter gain characteristic or oscillation characteristic in a wider wavelength band.

For fully attaining effects such as those mentioned above, it is preferred that the first and second doped areas have a relation of $0.1 \leq a/b \leq 0.9$, where a is the outer diameter of the first doped area, and b is the outer diameter of the second doped area. That is, the relation of $0.1 \leq a/b$ is necessary for attaining a sufficient gain, whereas the relation of $a/b \leq 0.9$ is necessary for preventing the rare-earth element and the main material, $SiO_2$, from binding together.

Third Embodiment

Figure 3B:
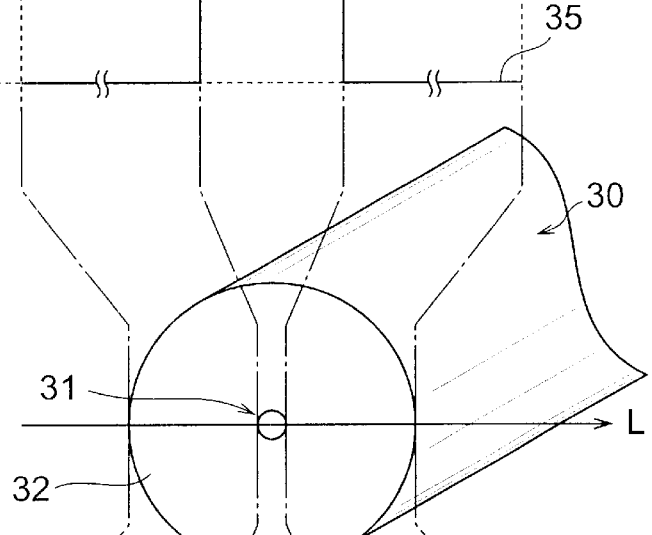
Figure 3C:
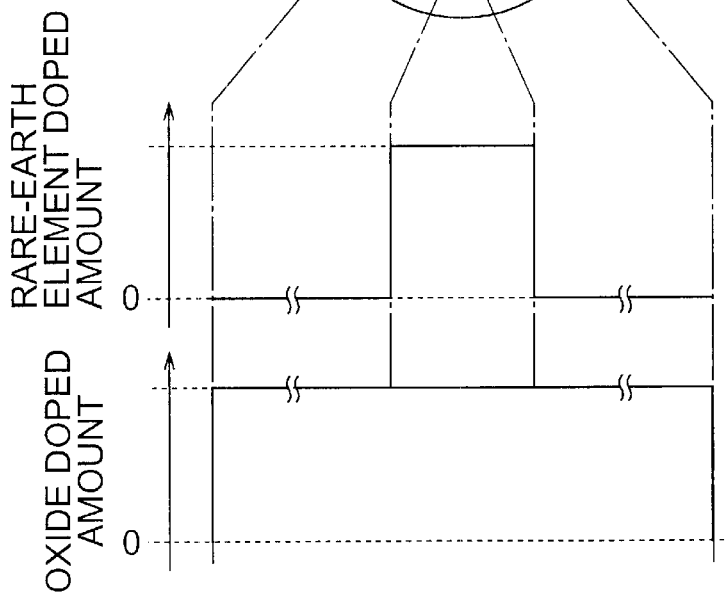
Figure 3D:
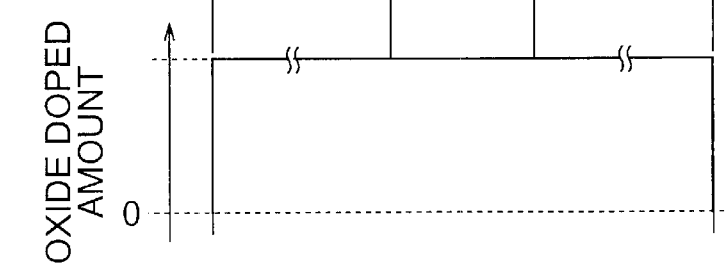
Figure 3E:
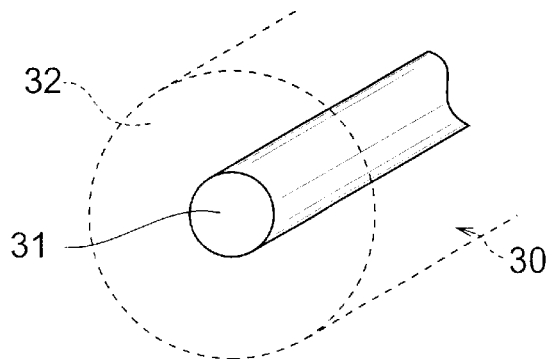

FIGS. 3A to 3E are views showing structures of the third embodiment in the light-amplifying optical fiber according to the present invention. In particular, FIG. 3A is a refractive index profile of the light-amplifying optical fiber according to the third embodiment, FIG. 3B is a view showing a cross-sectional structure of the light-amplifying optical fiber according to the third embodiment, FIG. 3C is a chart showing the doped amount of rare-earth element in the first doped area in the third embodiment, FIG. 3D is a chart showing the doped amount of oxide in the second doped area in the third embodiment, and FIG. 3E is a view showing a detailed cross-sectional structure of the core region in the light-amplifying optical fiber according to the third embodiment.

The light-amplifying optical fiber 30 according to the third embodiment is mainly made of $SiO_2$; and comprises, as shown in FIG. 3B, a core region 31, with a refractive index n1, extending along a predetermined axis, and a cladding region 32, with a refractive index n2 lower than that of the core region 31, provided on the outer periphery of the core region 31. As shown in FIG. 3E, the core region 31 constitutes a first doped area doped with at least a rare-earth element and an oxide (sub-host) such as $Al_2O_3$. Also, all the area of the core region 31 and cladding region 32 (which may be a part of the cladding region neighboring the core region 31) is doped with the sub-host, so as to constitute a second doped area.

As shown in FIG. 3A, the light-amplifying optical fiber 30 according to the third embodiment also has a matched type refractive index profile 35. The core region 31 is doped with a refractive index enhancing agent such as $GeO_2$ or Cl. Here, the cladding region 32 may be doped with F element, which is a refractive index lowering agent. Doping the cladding region 32 with F element is preferable from the viewpoint of lowering transmission loss since the doped amount of $GeO_2$ and the like can be reduced without modifying the shape of the refractive index profile 35.

The refractive index profile 35 of FIG. 3A indicates the refractive index in each part on the line L in FIG. 3B, in which areas 351 and 352 show the refractive indices of individual parts in the core region 31 and the cladding region 32, respectively.

The core region 31 is doped, as the first doped area, with a rare-earth element (see FIG. 3C). The doping rare-earth element is one of Er, Nd, Tm, Yb, and Pr, and generates a fluorescence having a wavelength in the infrared region when irradiated with a predetermined wavelength of excitation light. In particular, doping with Er element as the rare-earth element is preferable since it yields a fluorescence in the 1.55-$\mu$m wavelength band, which is a wavelength band yielding the lowest transmission loss in optical fibers in general.

Also, both of the core region 31 and cladding region 32 are doped, as the second doped area, with a sub-host. The doping sub-host is an oxide of an element having a valence different from the valence, 4, of the cation constituting the main material, $SiO_2$, of the light-amplifying optical fiber 30; and is any of $Al_2O_3$, $P_2O_5$, $Y_2O_3$, and $B_2O_3$, for example. Preferably, the doped amount of sub-host is substantially uniform in a diametric direction of the light-amplifying optical fiber 30 orthogonal to the optical axis thereof as shown in FIG. 3D.

In the light-amplifying optical fiber 30 according to the third embodiment, as explained in the foregoing, the first doped area (corresponding to the whole area of the core region 31) including the optical axis center is doped with a rare-earth element, whereas the second doped area (corresponding to the glass region defined by the core region 31 and cladding region 32) containing the first doped area and having an outer diameter greater than that of the first doped area is doped with a sub-host. Therefore, even if the rare-earth element or sub-host diffuses upon the heating and softening of the optical fiber preform in the process of making the light-amplifying optical fiber 30, the rare-earth element will reside within the second doped area where the sub-host exists, thereby greatly improving the probability of the rare-earth element binding to the sub-host. As a result, the light-amplifying optical fiber 30 according to the third embodiment yields a higher and flatter gain characteristic or oscillation characteristic in a wider wavelength band.

For fully attaining effects such as those mentioned above, it is preferred that the first and second doped areas have a relation of $0.1 \leq a/b \leq 0.9$, where a is the outer diameter of the first doped area, and b is the outer diameter of the second doped area. That is, the relation of $0.1 \leq a/b$ is necessary for attaining a sufficient gain, whereas the relation of $a/b \leq 0.9$ is necessary for preventing the rare-earth element and the main material, $SiO_2$, from binding together.

Fourth Embodiment

FIGS. 4A to 4E are views showing structures of the fourth embodiment in the light-amplifying optical fiber according to the present invention. In particular, FIG. 4A is a refractive index profile of the light-amplifying optical fiber according to the fourth embodiment, FIG. 4B is a view showing a cross-sectional structure of the light-amplifying optical fiber according to the fourth embodiment, FIG. 4C is a chart showing the doped amount of rare-earth element in the first doped area in the fourth embodiment, FIG. 4D is a chart showing the doped amount of oxide in the second doped area in the fourth embodiment, and FIG. 4E is a view showing a detailed cross-sectional structure of the core region in the light-amplifying optical fiber according to the fourth embodiment.

The light-amplifying optical fiber 40 according to the fourth embodiment is mainly made of $SiO_2$; and comprises, as shown in FIG. 4B, a core region 41 extending along a predetermined axis, and a cladding region 42, with a refractive index n2 lower than that of the core region 41, provided on the outer periphery of the core region 41. Here, the core region 41 comprises an inner core 41a with a refractive index n1, and an outer core 41b, provided on the outer periphery of the inner core 41a, having a refractive index n3 lower than that of the inner cord 41a. In the core region 41, as shown in FIG. 4E, the inner core 41a constitutes a first doped area doped with at least a rare-earth element and an oxide (sub-host) such as $Al_2O_3$. Also, the inner core 41a and the outer core 41b are doped with the sub-host, and constitute a second doped area.

As shown in FIG. 4A, the light-amplifying optical fiber 40 according to the fourth embodiment also has a matched type refractive index profile 45. While the core region 41 is doped with a refractive index enhancing agent such as $GeO_2$ or Cl, the refractive index n1 of the inner core 41a constituting the first doped area is set higher than the refractive index n3 of the outer core 41b. Here, the cladding region 42 may be doped with F element, which is a refractive index lowering agent. Doping the cladding region 42 with F element is preferable from the viewpoint of lowering transmission loss since the doped amount of $GeO_2$ and the like can be reduced without modifying the shape of the refractive index profile 45.

The refractive index profile 45 of FIG. 4A indicates the refractive index in each part on the line L in FIG. 4B, in which areas 451, 452, and 453 show the refractive indices of individual parts in the inner core 41a of the core region 41, the outer core 41b of the core region 41, and the cladding region 42, respectively.

The inner core 41a in the core region 41 is doped, as the first doped area, with a rare-earth element (see FIG. 4C). The doping rare-earth element is one of Er, Nd, Tm, Yb, and Pr, and generates a fluorescence having a wavelength in the infrared region when irradiated with a predetermined wavelength of excitation light. In particular, doping with Er element as the rare-earth element is preferable since it yields a fluorescence in the 1.55-$\mu$m wavelength band, which is a wavelength band yielding the lowest transmission loss in optical fibers in general.

Also, both of the inner core 41a and outer core 41b are doped, as the second doped area, with a sub-host. The doping sub-host is an oxide of an element having a valence different from the valence, 4, of the cation constituting the main material, $SiO_2$, of the light-amplifying optical fiber 40; and is any of $Al_2O_3$, $P_2O_5$, $Y_2O_3$, and $B_2O_3$, for example. Preferably, the doped amount of sub-host is substantially uniform in a diametric direction of the light-amplifying optical fiber 40 orthogonal to the optical axis thereof as shown in FIG. 4D.

In the light-amplifying optical fiber 40 according to the fourth embodiment, as explained in the foregoing, the first doped area (corresponding to the inner core 41a) including the optical axis center is doped with a rare-earth element, whereas the second doped area (corresponding to the whole core region 41 constituted by the inner core 41a and outer core 41b) containing the first doped area and having an outer diameter greater than that of the first doped area is doped with a sub-host. Therefore, even if the rare-earth element or sub-host diffuses upon the heating and softening of the optical fiber preform in the process of making the light-amplifying optical fiber 40, the rare-earth element will reside within the second doped area where the sub-host exists, thereby greatly improving the probability of the rare-earth element binding to the sub-host. As a result, the light-amplifying optical fiber 40 according to the fourth embodiment yields a higher and flatter gain characteristic or oscillation characteristic in a wider wavelength band.

For fully attaining effects such as those mentioned above, it is preferred that the first and second doped areas have a relation of $0.1 \leq a/b \leq 0.9$, where a is the outer diameter of the first doped area, and b is the outer diameter of the second doped area. That is, the relation of $0.1 \leq a/b$ is necessary for attaining a sufficient gain, whereas the relation of $a/b \leq 0.9$ is necessary for preventing the rare-earth element and the main material, $SiO_2$, from binding together.

The results of comparisons of the individual embodiments of the light-amplifying optical fiber according to the present invention with conventional light-amplifying optical fibers will now be explained.

The initially prepared sample is the light-amplifying optical fiber 10 according to the first embodiment comprising the structures shown in FIGS. 1A to 1E. This light-amplifying optical fiber 10 is mainly made of $SiO_2$, whereas its core region 11 is doped with $GeO_2$. In the core region 11, the inner core 11a constituting the first doped area is doped with a rare-earth element (Er element), whereas the inner core 11a and outer core 11b constituting the second doped area are doped with a sub-host ($Al_2O_3$).

The sample having such a configuration was manufactured by a combination of MCVD and immersion methods.

First, a glass pipe 100 (member to become a part of the cladding region 12 of the light-amplifying optical fiber 10) made of $SiO_2$ as a main material was prepared. This glass pipe 100 had been provided with a through hole 101 (see FIG. 5A). On the inner wall of the glass pipe 100 defining the through hole 101, porous glass particles were deposited by heating and oxidization of a mixed gas of $SiCl_4$, $GeCl_4$, and $O_2$. Thereafter, the glass pipe 100 was immersed in an aqueous aluminum nitrate solution, so that $Al_2O_3$ was added into the deposited porous member, which were then heated so as to become transparent. The layer 110 formed by this step is a layer to become the outer core 11b doped with $GeO_2$ and the sub-host ($Al_2O_3$) in the light-amplifying optical fiber 10 (see FIG. 5B).

Subsequently, porous glass particles were formed on the inner wall of thus formed layer 110 by a method similar to that used for making the layer 110. Thereafter, the glass pipe 100 was immersed in an aqueous solution of erbium chloride and aluminum sulfate, so that Er element and $Al_2O_3$ were added to the deposited porous member, which was then heated so as to become transparent. The layer 120 formed by this step is a layer to become the inner core 11a doped with $GeO_2$, the rare-earth element (Er), and the sub-host ($Al_2O_3$) in the light-amplifying optical fiber 10 (see FIG. 5C).

Figure 5A:
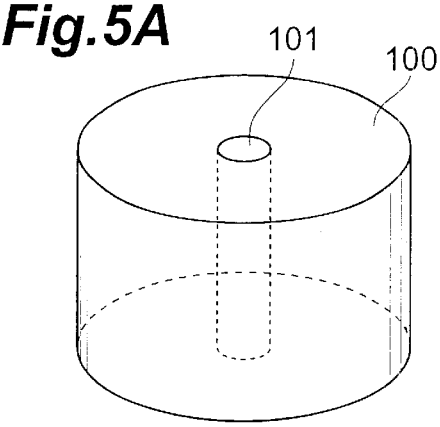
FIGS. 5A to 5E are views showing steps of a method of making a light-amplifying optical fiber according to the present invention.
Figure 5B:
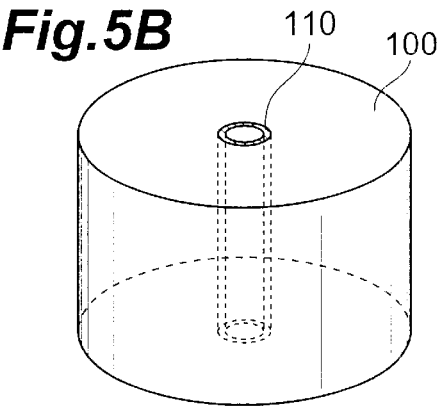
Figure 5C:
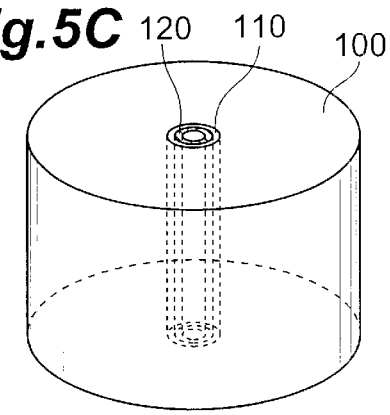
Figure 5D:
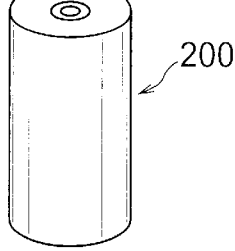
Figure 5E:
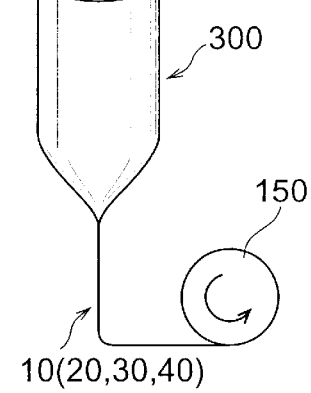

The glass pipe 100 formed with the layers 110 and 120 to constitute the core region 11 by way of the foregoing steps was-collapsed (solidified), whereby a core rod 200 was obtained (see FIG. 5D). The outer periphery of this core rod 200 was further provided with a layer 250 to become a jacket layer (region corresponding to the outer portion of the cladding region 12 and not contributing to light propagation), whereby an optical fiber preform 300 was obtained. As this optical fiber preform 300 was taken up by a roller 150 while being drawn, the sample of the light-amplifying optical fiber 10 according to the first embodiment was obtained (see FIG. 5E).

Figure 6:
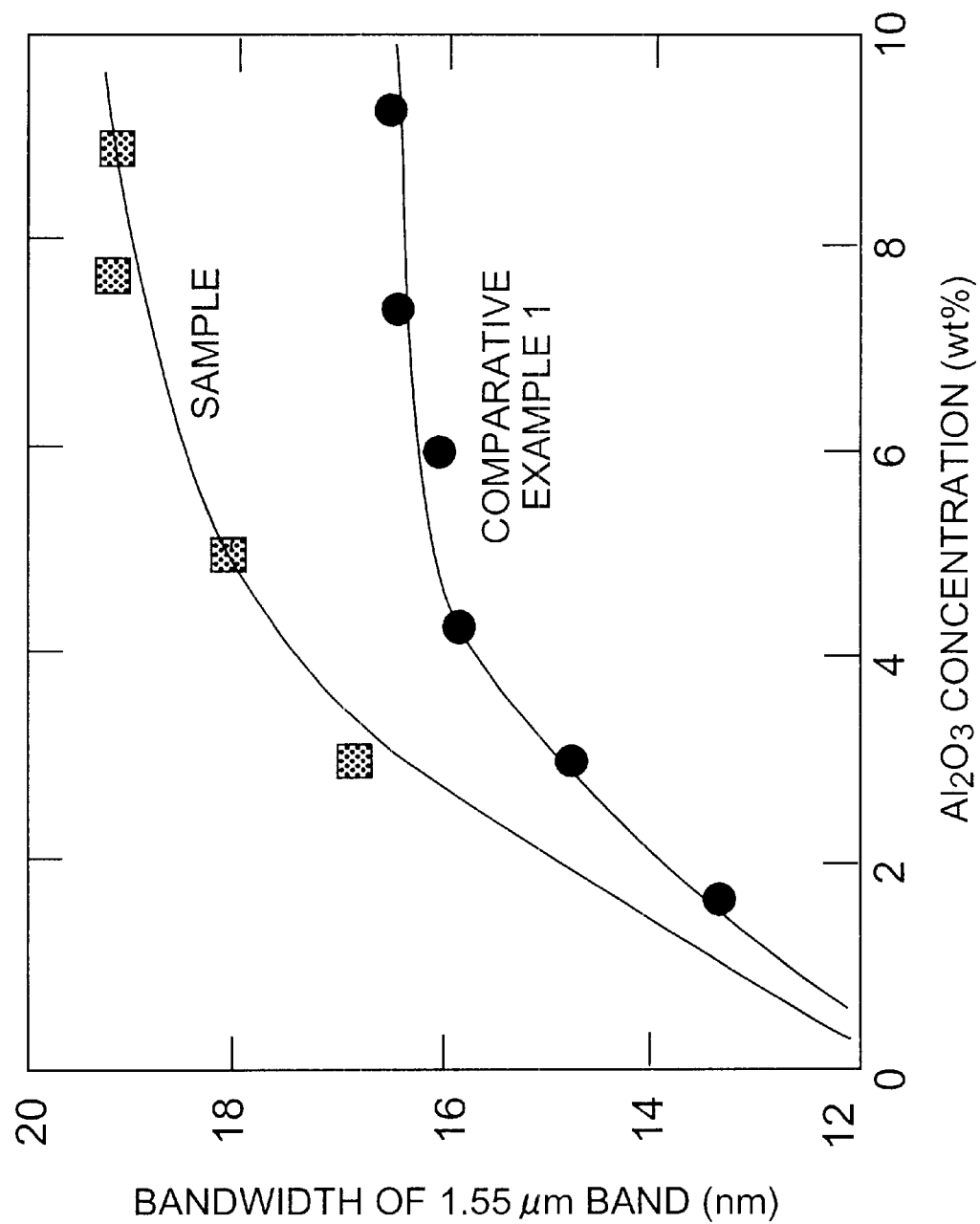
FIG. 6 is a graph showing a relationship between the bandwidth of 1.55-μm wavelength band and the concentration (wt %) of $Al_2O_3$ added to the second doped area concerning a sample of the light-amplifying optical fiber according to the present invention (having the configuration of the first embodiment) and a light-amplifying optical fiber as a comparative example.

FIG. 6 is a graph showing a relationship between the bandwidth of 1.55-μm wavelength band and the concentration (wt %) of $Al_2O_3$ added to the second doped area concerning the sample (having the configuration of the first embodiment) obtained by way of the foregoing steps and a light-amplifying optical fiber as a comparative example. Comparative Example 1 shown in the graph of FIG. 6 comprises a structure in which a part of the core region is doped with both Er element and $Al_2O_3$.

Figure 7:
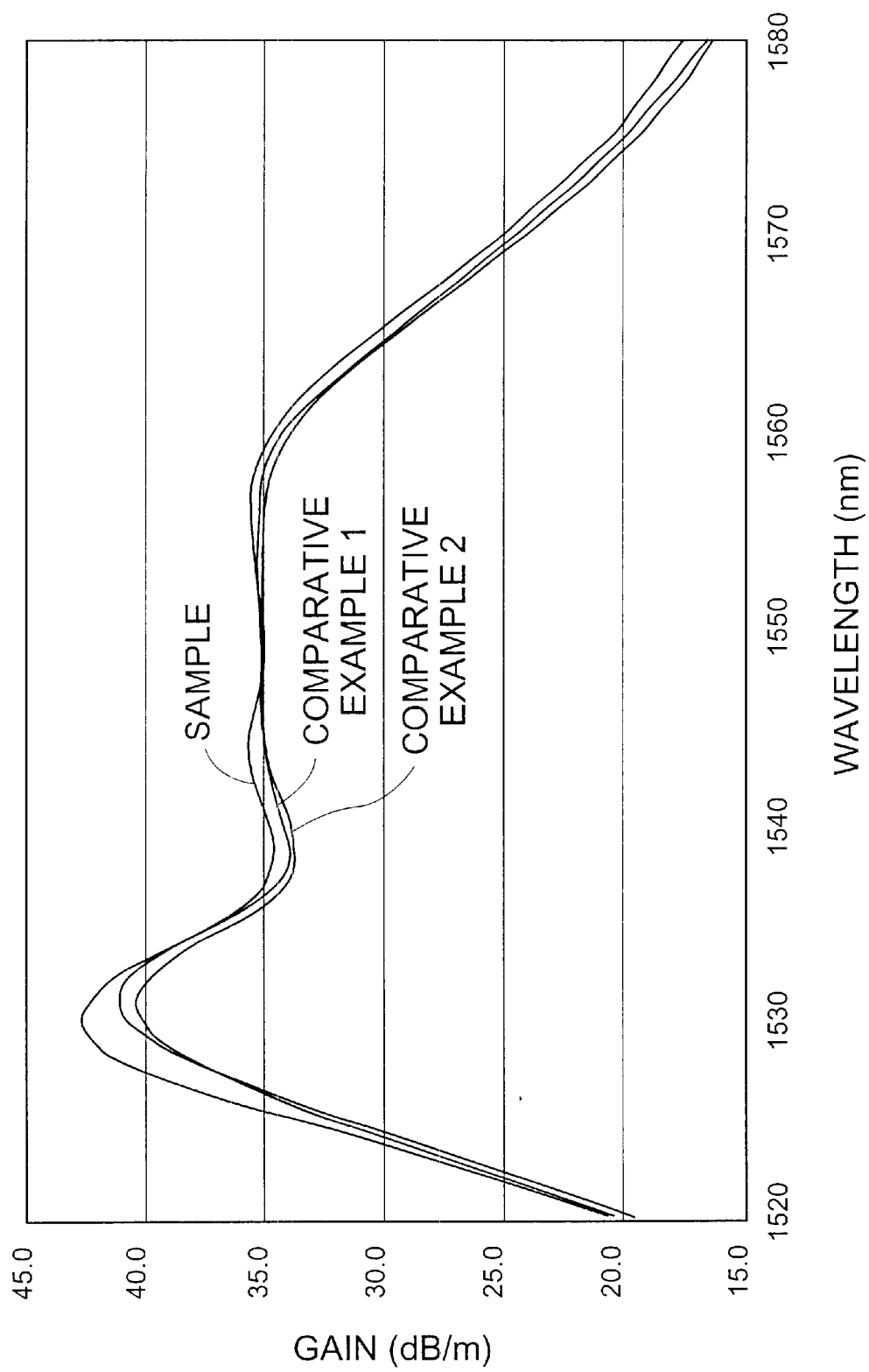
FIGS. 7 and 8 are graphs showing the wavelength dependence of gain in 1.55-μm wavelength band concerning a sample of the light-amplifying optical fiber according to the present invention (having the configuration of the first embodiment) and a plurality of kinds of light-amplifying optical fibers as comparative examples.
Figure 8:
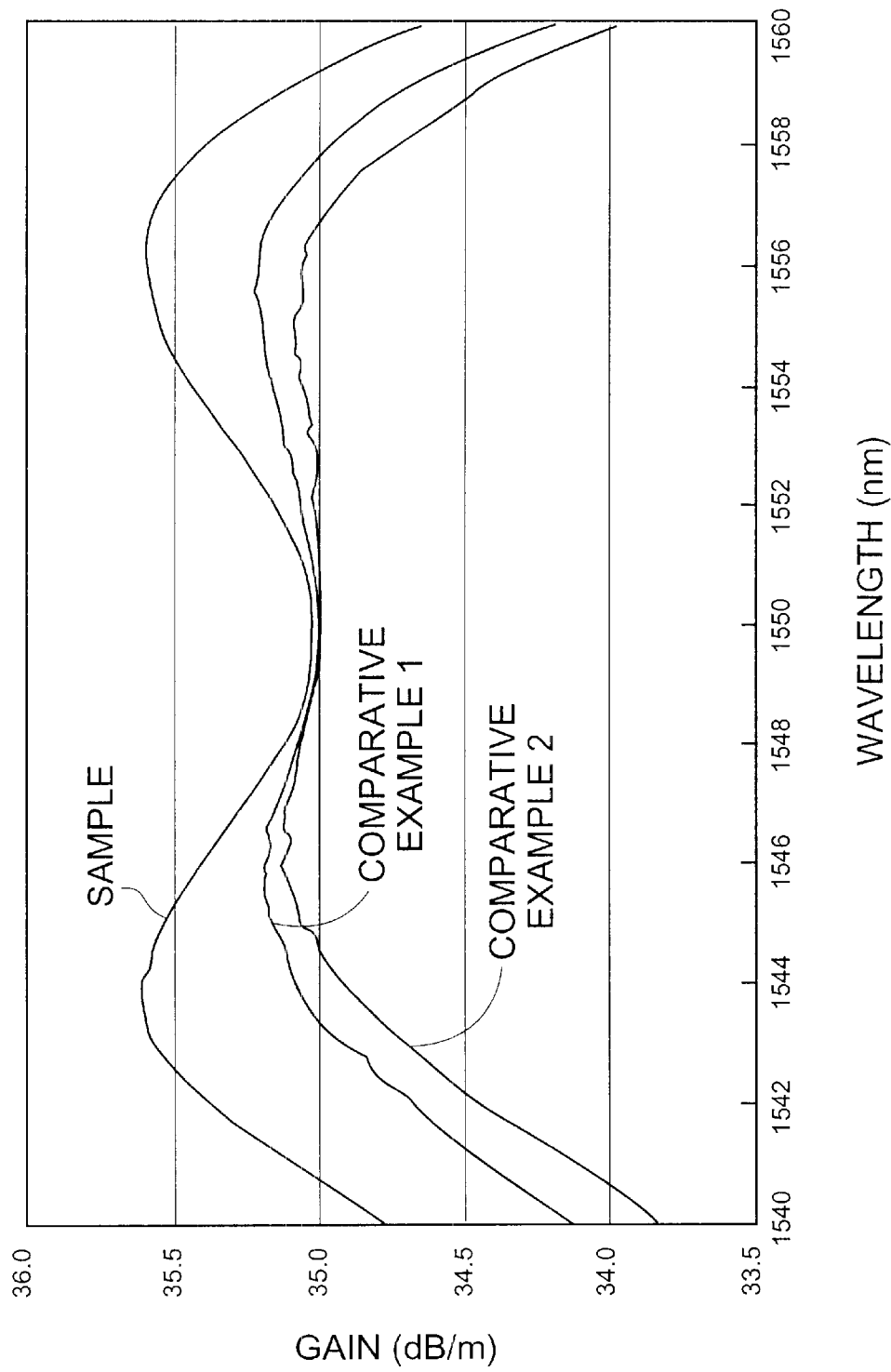

FIG. 7 is a graph showing the wavelength dependence of gain in 1.55-μm wavelength band concerning the sample (having the configuration of the first embodiment) obtained by way of the foregoing steps and a plurality of kinds of light-amplifying optical fibers as comparative examples. In the graph of FIG. 7, Comparative Example 1 comprises a structure in which a part of the core region is doped with both Er element and $Al_2O_3$, whereas Comparative Example 2 comprises a structure in which the whole core region is doped with both Er element and $Al_2O_3$. On the other hand, FIG. 8 is a graph enlarging a part of the wavelength band shown in the graph of FIG. 7. The doped amount of Er added to the light-amplifying optical fibers shown in FIGS. 7 and 8 is 1000 wtppm (0.01 wt %).

From the graph of FIG. 6, it can be seen that the bandwidth of the wavelength band having a gain of 35 dB or more and a gain deviation of 1 dB or less is 18 nm or more. Thus, the sample according to the first embodiment has a bandwidth greater than that of the light-amplifying optical fiber of Comparative Example 1, i.e., 12 nm, and that of the light-amplifying optical fiber of Comparative Example 2, i.e., 14 nm.

Further, the inventors made a sample of the light-amplifying optical fiber 20 according to the second embodiment (FIGS. 2A to 2E).

The sample according to the second embodiment is mainly made of $SiO_2$. In this sample, a rare-earth element (Er element) is added to the inner core 21a, a sub-host ($Al_2O_3$) is added to the inner core 21a and the intermediate core 21b, and $GeO_2$ is substantially uniformly added to the inner core 21a, intermediate core 21b, and outer core 21c.

This sample was also manufactured by a combination of MCVD and immersion methods (see FIGS. 5A to 5E).

First, a glass pipe 100 (corresponding to a part of the cladding region 22 of the light-amplifying optical fiber 20) made of $SiO_2$ was prepared in this sample as well (see FIG. 5A). On the inner wall of the glass pipe 100 defining the through hole 101, porous glass particles were deposited by heating and oxidization of a mixed gas of $SiCl_4$, $GeCl_4$, and $O_2$, and was heated so as to become transparent. As a consequence, a layer (containing $GeO_2$) to become the outer core 21c of the light-amplifying optical fiber 20 was formed on the inner wall of the through hole 101 of the glass pipe 100. The subsequent steps of forming the intermediate core 21b (containing $GeO_2$ and $Al_2O_3$) and inner core 21a (containing $GeO_2$, Er element, and $Al_2O_3$) constituting the core region 21 are as explained with-reference to FIGS. 5B to 5D. The outer periphery of the core rod 200 was further provided with a layer 250 to become a jacket layer (region corresponding to the outer periphery portion of the cladding region 22 and not contributing to light propagation) in the making of this sample as well, whereby an optical fiber preform 300 was obtained. As this optical fiber preform 300 was taken up by a roller 150 while being drawn, the sample according to the second embodiment was obtained (see FIG. 5E).

Figure 9:
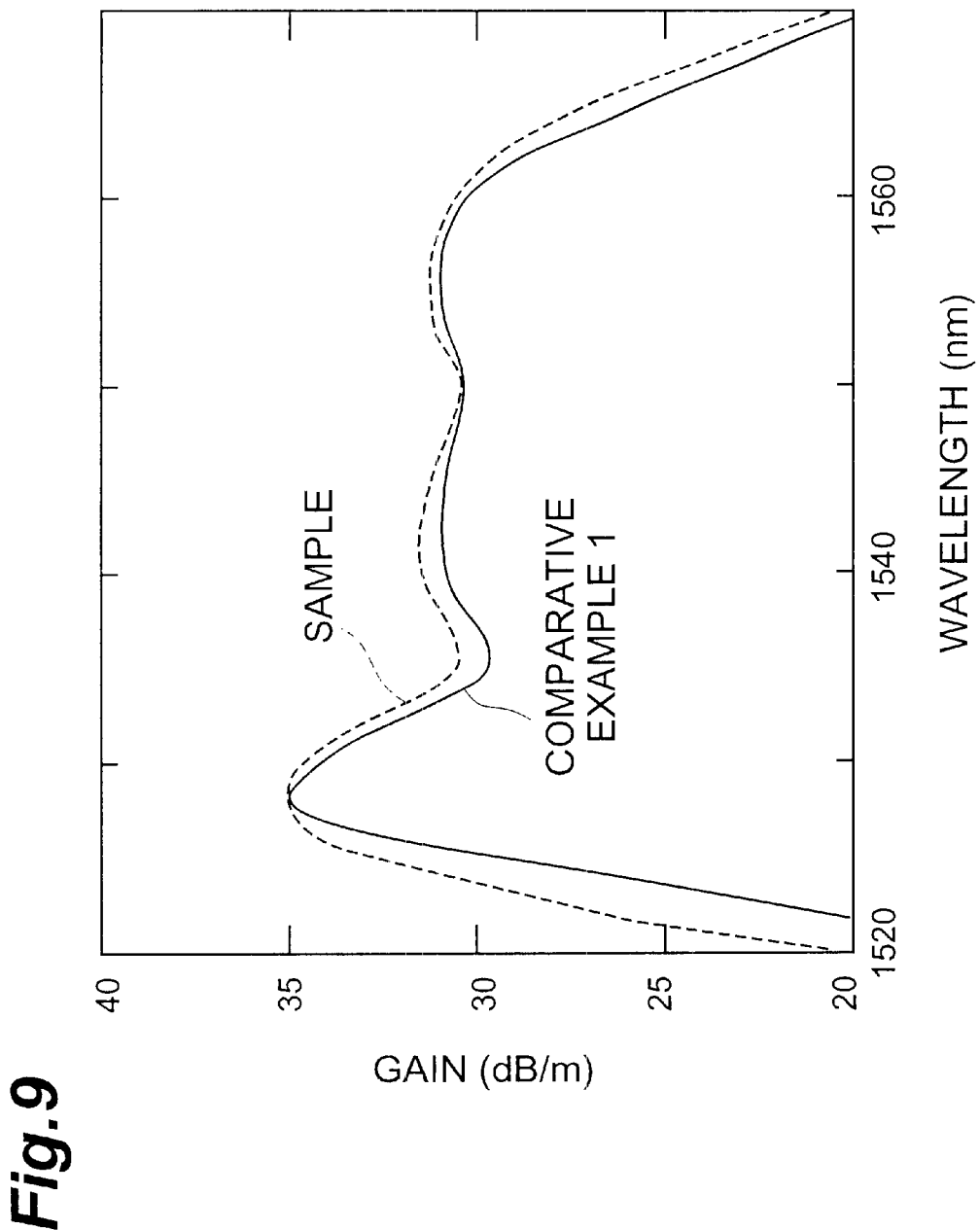
FIG. 9 is a graph showing the wavelength dependence of gain in 1.55-μm wavelength band concerning a sample of the light-amplifying optical fiber according to the present invention (having the configuration of the second embodiment) and a light-amplifying optical fiber as a comparative example.

FIG. 9 is a graph showing the wavelength dependence of gain in 1.55-μm wavelength band concerning the sample (having the configuration of the second embodiment) obtained by way of the foregoing steps and a light-amplifying optical fiber as a comparative example. In the graph of FIG. 9, Comparative Example 1 comprises a structure in which a part of the core region is doped with both Er element and $Al_2O_3$. In each of the sample according to the second embodiment and Comparative Example 1, the concentration of $Al_2O_3$ was varied so as to adjust the population inversion such that the gain deviation in the Wavelength range of 1.54 μm to 1.56 μm was minimized, and the gain at a wavelength of 1.55 μm was designed to become 30 dB. In this sample, the bandwidth of a light-amplifying wavelength band yielding a gain of 30±0.5 dB was determined as about 20 nm. It is wider than that in the light-amplifying optical fiber of Comparative Example 1.

Industrial Applicability

As explained in the foregoing, the present invention is designed such that the outer diameter of the second doped area, which is an area containing the first doped area doped with a rare-earth elements and being doped with an oxide of an element having a valence different from that of a cation constituting a main material of the light-amplifying optical fiber, becomes greater than that of the first doped area. Hence, even if the rare-earth element in the first doped area diffuses upon the heating and softening of the optical fiber preform in the process of making the light-amplifying optical fiber, the oxide in the second doped area will similarly diffuse, whereby the rare-earth element will substantially reside within the second doped area. As a result, a light-amplifying optical fiber having a flatter gain characteristic or oscillation characteristic over a wider wavelength band can be obtained.

What is claimed is:

1. A light-amplifying optical fiber comprising a core region extending along a predetermined axis; and a cladding region, provided on the outer periphery of said core region, having a lower refractive index than said core region;

wherein a first doped area with an outer diameter a which includes said predetermined axis and is substantially doped with a rare-earth element exists in a second doped area with an outer diameter b>a which contains an oxide of an element having a valence different from that of a cation constituting a main material, $SiO_2$, of said light-amplifying fiber; and wherein the ratio (a/b) of the outer diameter a of said first doped area to the outer diameter b of said second doped area is 0.1 or more but 0.9 or less.

2. A light-amplifying optical fiber according to claim 1, wherein said first doped area constitutes a part of said core region, wherein said second doped area constitutes the whole of said core region.

3. A light-amplifying optical fiber according to claim 1, wherein said first doped area constitutes the whole of said core region, whereas said second doped area constitutes said core region and at least a part of said cladding region.

4. A light-amplifying optical fiber according to claim 1, wherein said core region comprises:

a first core constituting said first doped area; and a second core which is a region provided on the outer periphery of said first core, said second core having a lower refractive index than said first core and constituting a part of said second doped area.

5. A light-amplifying optical fiber according to claim 1, wherein said oxide in said second doped area has a doped amount substantially uniform in a diametric direction of said second doped area orthogonal to said predetermined axis.

6. A light-amplifying optical fiber according to claim 1, wherein said rare-earth element added to said first doped area includes at least one of Er, Nd, Tm, Yb, and Pr.

7. A light-amplifying optical fiber according to claim 1, wherein, an oxide of an element having a valence different from that of a cation constituting a main material of said light-amplifying optical fiber includes at least one of $Al_2O_3$, $P_2O_5$, $Y_2O_3$, and $B_2O_3$.

8. A light-amplifying optical fiber according to claim 1, wherein said core region is doped with at least one of $GeO_2$ and a halogen element.

* * * * *